(12) United States Patent
Peterson et al.

(10) Patent No.: US 6,616,839 B1
(45) Date of Patent: *Sep. 9, 2003

(54) PORTABLE WATER TREATMENT FACILITY

(75) Inventors: Michael J. Peterson, Nashville, TN (US); Richard M. Russell, Brentwood, TN (US); David H. Albright, Pleasant View, TN (US)

(73) Assignee: Dialysis Systems, Inc., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/724,863

(22) Filed: Nov. 28, 2000

Related U.S. Application Data (63) Continuation of application No. 09/122,000, filed on Jul. 24, 1998, now Pat. No. 6,228,255.

(51) Int. Cl.⁷ .............................................. B01D 15/08
(52) U.S. Cl. ...................... 210/241; 210/90; 210/103; 210/143; 210/257.2
(58) Field of Search ................... 210/636, 641, 210/241, 638, 257.2, 289, 282, 195.2, 85, 90, 134, 103, 143, 232, 321.69, 321.71

(56) References Cited

U.S. PATENT DOCUMENTS

| | | | | |
|---|---|---|---|---|
| 4,444,597 A | | 4/1984 | Gortz et al. .................... 134/18 |
| 4,942,630 A | * | 7/1990 | Kantor ........................ 210/169 |
| 5,139,675 A | | 8/1992 | Arnold et al. ............... 210/636 |
| 5,158,441 A | | 10/1992 | Aid et al. ..................... 417/500 |
| 5,244,579 A | | 9/1993 | Horner et al. ............... 210/652 |
| 5,254,250 A | * | 10/1993 | Rolchigo ................ 210/321.67 |
| 5,256,371 A | | 10/1993 | Pippert ......................... 422/28 |
| 5,336,165 A | | 8/1994 | Twardowski ................... 604/5 |
| 5,401,421 A | | 3/1995 | Blum ......................... 210/742 |
| 5,433,843 A | | 7/1995 | Calabrese ................... 210/138 |
| 5,480,565 A | | 1/1996 | Levin et al. ................. 210/764 |
| 5,484,397 A | | 1/1996 | Twardowski ................... 604/5 |
| 5,494,573 A | | 2/1996 | Schoenmeyr et al. ......... 210/94 |
| 5,543,040 A | | 8/1996 | Fite, Jr. et al. ............. 210/167 |
| 5,582,600 A | * | 12/1996 | Loh ............................ 604/283 |
| 5,589,070 A | | 12/1996 | Maltais et al. .............. 210/636 |
| 5,591,344 A | | 1/1997 | Kenley et al. .............. 210/636 |
| 5,601,421 A | | 2/1997 | Lee ............................ 417/492 |
| 5,624,551 A | | 4/1997 | Baumann et al. ........... 210/134 |
| 5,865,991 A | * | 2/1999 | Hsu ............................. 210/87 |
| 5,958,252 A | * | 9/1999 | Shades ....................... 210/748 |
| 6,228,255 B1 | * | 5/2001 | Peterson ...................... 210/90 |

* cited by examiner

*Primary Examiner*—Ernest G. Therkorn
(74) *Attorney, Agent, or Firm*—Waddey & Patterson; Lucian Wayne Beavers (57) ABSTRACT

The present invention discloses a portable water treatment facility. The water treatment facility has housing on castors. The housing houses the water treatment member. The housing has various doors which are locked to make the housing tamper resistant. The housing has an external sampling station which allows a technician at any point in time to ensure that all of the liquids being provided by the water treatment member meet specifications. This system has a modular water treatment member consisting of various filters, tanks, and pumps which are attached to one another by short fluid conduits with quick disconnects. The system is computer monitored, capable of remoting data offsite and producing an audit trail capturing system operational parameters and quality of water produced over time.

7 Claims, 7 Drawing Sheets

PORTABLE WATER TREATMENT FACILITY

This application is a continuation of our application Ser. No. 09/122,000 filed Jul. 24, 1998 now U.S. Pat. No. 6,228,255.

BACKGROUND OF THE INVENTION

The present invention relates generally to a water treatment facility and more particularly to a water treatment facility that is portable and securable.

It will be appreciated by those skilled in the art that water treatment facilities are needed in various fields. One key field is in hemodialysis. Simply put, hemodialysis aids a patient whose body is incapable of filtering the blood. At hemodialysis centers, the prior art has used stationary and fixtured facilities to filter the water necessary to the purity necessary for hemodialysis machines. These water treatment facilities typically consume 400 square feet or more of clinic space. These facilities are attached as fixtures and become permanent parts of the building. Unfortunately, these water treatment facilities are typically located in unsecured spaces with no measures to prevent tampering.

The fact that these water treatment facilities are fixtures means that once placed into a hemodialysis center, they can not be easily removed. Additionally, from a tax consequence, these items are treated as fixtures as opposed to personal property.

Because of the sheer size of the systems and the manner in which they have been piped, if an element goes out, the system can have a significant down time.

Additionally, the sheer size of these systems creates large areas for bacteria growth and the potential for "dead legs." Dead legs are zones or segments of piping where fluids remain quiescent (limited circulation) either continuously or intermittently. Dead legs are typically defined as dead end piping terminations or cavities that are longer than six (6) pipe diameters from the active piping. Dead legs can provide locations for bacteria to breed, increasing the concentration of pyrogens and endotoxins in the water supply. Additionally, current systems are assembled using solvent welded joints which require special assembly, cleaning and flushing procedures.

Smaller, portable systems have been described. However, these systems are not designed for use in a dialysis clinic, where a volume of water must be purified sufficiently to be used in multiple dialysis machines. U.S. Pat. No. 5,591,344 to Kenley, et al., describes a portable reverse osmosis system for use in a home or a room in a convalescent center. The system is part of a portable dialysis unit, and is made of components which can withstand heat disinfection. Hot and cold water are mixed to a temperature appropriate for use in a dialysis machine. Sensors detect abnormalities in the system, and operation is described on a visual display with touch screen. However, the system described consists of two subunits—a water pretreatment subunit fitted under a bathroom or kitchen sink, and a water treatment subunit which comprises part of the portable dialysis machine module. Sampling ports are described, but these ports are located at various points within the system, and samples must be taken using a syringe in order to avoid contaminating the system. Sampling is not done from a single location, where ports are accessible from outside the system, while other components remain inaccessible and resistant to tampering. The system must be exposed for sampling, and therefore potential tampering may occur during the sampling process.

The system described by of Kenley, et al., also constitutes a system for individual use rather than describing a portable system capable of providing water for a number of dialysis machines within a dialysis clinic.

U.S. Pat. No. 5,244,579 to Horner, et al., also describes a portable reverse osmosis system for the purification of water. However, this system is designed to purify water to a portable drinking water level and not to a level of purity appropriate for hemodialysis. The system output is described as no more than 20 gallons per minute. Fluid connections between components of the systems described by Horner and Kenley are relatively fixed. At best, they may be heat disinfected, as described by Kenley.

Previous inventions, such as U.S. Pat. No. 5,480,565 to Levin, et al., have described heat disinfection of dialysis machines or water treatment units. The size or composition of most systems presently in use for dialysis clinics makes heat disinfection difficult and prohibits the use of heat sterilization techniques. A system with removable and replaceable autoclavable components would provide distinct benefits in a health care setting.

In present systems, fixed pipe and valve configurations require technical operators to follow precise instructions on the turning of flow valves whenever carbon treatment tanks are replaced (typically every 90 days). The complexity and infrequent operation of replacement creates a potential hazard that the setting of valves will permit the changed carbon tanks to be "bypassed," thereby permitting unsafe levels of chlorine and chloramine to come in contact with patient's blood through artificial kidney dialysis.

What is needed, then, is a system which eliminates tampering or inadvertent positioning of valves leading to bypass of critical water purifying elements. What is needed is a method and design which prevents the operator from operating the system without carbon treatment. This needed system must provide an outer skin or housing which provides "tamper resistant" packaging which may be monitored for tampering. This needed system must reduce the size of a standard water treatment plant by at least one-third thereby allowing economical use of Teflon(, stainless steel, and other more appropriate heat disinfectable or sterilizable but more expensive materials. This needed system must be mobile and fully modular allowing significant reduction in times for service plus allowing depreciation as personal property. This needed system must provide components which can be heat disinfected or sterilized in addition to conventional chemical disinfection. This needed system must minimize dead legs. This needed system must minimize any inefficiencies of design conversions. This needed system must be designed to reduce factors which favor microbiological growth. This needed system must allow the removal and replacement of certain elements with minimal time and expense. This needed system must allow service while in operation. The needed system must, by design, be manufactured to ensure the quality of the system, the efficiency of the process, the reproducibility of the product, and the security of the system. What is needed is a large scale portable system for relief of dialysis treatment needs in disaster areas or parts of the United States and other countries lacking in quality technical personnel. This system must be capable of being remotely and digitally monitored. This system must provide an audit trail for verifying system operation and quality of product and which is remotely monitored. What is needed is a system which allows for easy substitution or addition of water purifying elements such as ultra filters, ultraviolet disinfection lights, or other purifying elements and allows for the easy configuring of system components in series or parallel to achieve greater process reliability through redundancy, improved water quality, and/or greater flow capacity. This needed system is presently lacking in the prior art.

SUMMARY OF THE INVENTION

The present invention discloses a portable water treatment facility. The water treatment facility has housing on castors. The housing fully encloses all the water treatment components and interconnect piping to comprise a water treatment member. The housing has various doors which are locked to make the housing tamper resistant. The housing has an external sampling station which allows a technician at any point in time to sample liquids being provided by the enclosed water treatment system for assay and verification of the water quality at various treatment points against specified values. This system has a modular water treatment member consisting of various filters, tanks, and pumps which are attached to one another by short fluid conduits with valved quick disconnects.

Accordingly, one object of the present invention is to eliminate tampering.

Another object of the present invention is to prevent inadvertent positioning of valves which would lead to bypass of critical water purification elements (carbon filtration).

Another object of the present invention is to provide an outer skin which provides tamper resistant enclosure which may be monitored for tampering.

Another object of the present invention is to reduce the size of a standard water treatment plant thereby reducing the floor area required for installation and allowing smaller building requirements, economical use of Teflon®, stainless steel, and other more appropriate, sterilizable, but more expensive materials.

Another object of the present invention is, by reducing its size, to minimize surface areas available for bacterial growth.

Another object of the present invention is to provide a unit which is mobile.

Still another object of the present invention is to provide a unit which is fully modular thereby allowing sufficiently reduced times for service.

Another object of the present invention is to provide a system which can be leased or depreciated as personal property as opposed to being a fixture.

Another object of the present invention is to provide components which can be heat disinfected or sterilized in addition to conventional chemical disinfection.

Another object of the present invention is to provide a design which minimizes dead legs.

Another object of the present invention is to provide a system which allows for easy substitution or addition of water purifying elements such as ultra filters, ultraviolet disinfection devices, or other purifying elements and allows for the easy configuring of system components in series or parallel to achieve greater process reliability through redundancy, improved water quality, and/or greater flow capacity.

A still further object of the present invention is to provide a system which is modular and allows for easy design conversions.

Yet another object of the present invention is to provide a system which eliminates solvent joints and other potential sites for microbiological growth.

Another object of the present invention is to provide a system which allows for removal and replacement of components with a minimal time and expense.

Another object of the present invention is to provide a system which allows for service while in operation.

Another object of the present invention is to provide a water purification system for dialysis needs to disaster areas or parts of the world lacking in qualified technical personnel.

An object of the present invention is to provide a digitally and remotely monitored system that can also provide an audit trail locally or remotely to verify system operation and product quality.

Other objects of the invention include an audit trail which may be produced of unit operation and the quality of water produced; provide a system which is fully and continuously monitored for efficiency of operation and quality of product; may be remotely monitored; and operation data may be logged and tended over time.

DESCRIPTION OF THE PREFERRED EMBODIMENTS

Figure 1:
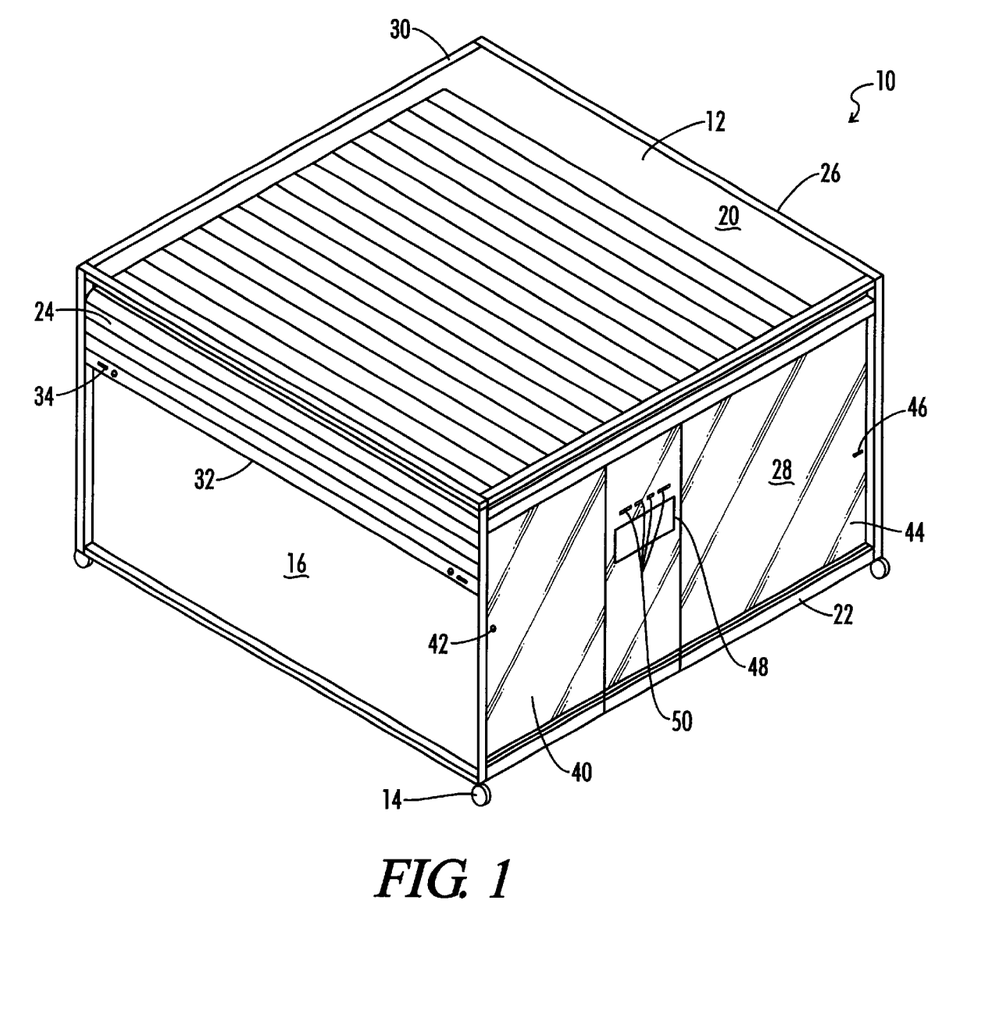
FIG. 1 is an isometric view of the portable water treatment facility of the present invention.

Referring now to FIG. 1, there is shown generally at 10 the portable water treatment facility of the present invention. Generally, facility 10 has housing 12 on castors 14, housing 12 houses and encapsulates water treatment member 16. Water treatment member 16 will be described in greater detail later. Housing 12 generally has roof 20 joined to base 22 by left side 24, right side 26, front 28, and rear 30. In the preferred embodiment, housing 12 forms a box. However, any shape can be used that encompasses water treatment member 16 and makes it tamper resistant if desired. Left side 24 and right side 26 can have side doors 32. In the preferred embodiment, side door 32 is a sliding aluminum steel frame door having side door lock 34. In order to access either right side 26 or left side 24, side door 32 can have side door lock 34 unlocked and side door 32 can be raised. Rear 30 can have any type of door as well as to access the rear components. In the preferred embodiment, front 28 has first front door 40 having first front door lock 42 and second front door 44 with second front door lock 46. In the preferred embodiment, front doors 40, 44 are made of high impact plastic, preferably Lexan® polymer, sheets. This can make front doors 40, 44 both tamper resistant as well as transparent so that a technician can view water treatment member 16 without opening doors 40, 44. In the preferred embodiment, sample station 48 is provided so that a technician at any time can get any one of preferably four sample buttons 50 to obtain samples of water prior to and after treatment by the various unit operations.

Figure 2:
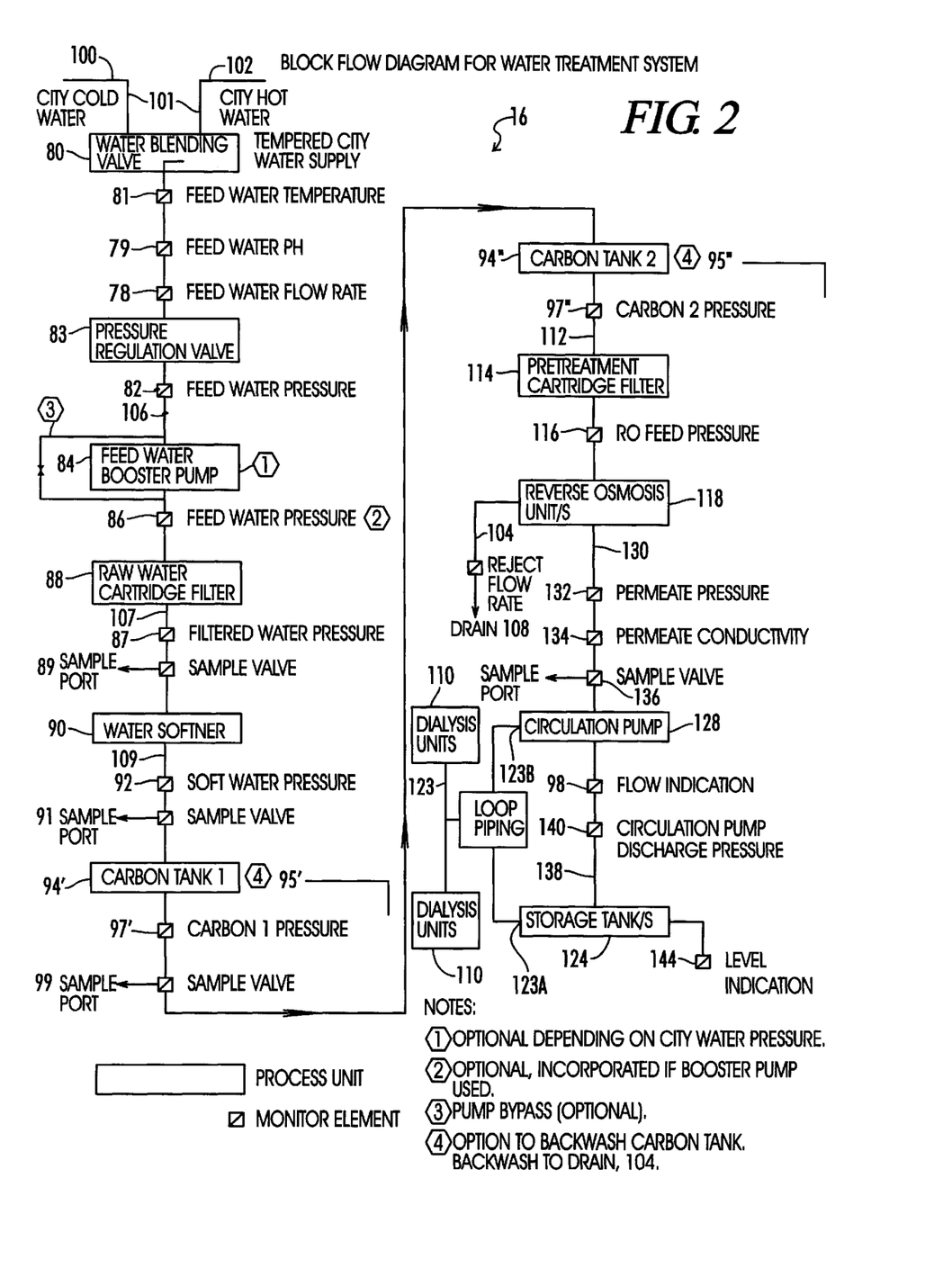
FIG. 2 is a process flow diagram of the water treatment member of the present invention.

Referring now to FIG. 2, there is shown generally at 16 a block diagram view of the water treatment member of the present invention. As can be seen, cold water 100 and hot water 102 forming water source 101 come into water treatment 16 while waste material 104 is removed from member 16 by drain 108. As cold water 100 and hot water 102 come into system, water passes through tempering or water blending valve 80 which controls the temperature of the combination of cold water 100 and hot water 102. If the water needs to be hotter, more hot water is added by automatic adjustment of tempering valve 80. If the water needs to be colder, more cold water is added. After passing through tempering valve 80, first pressure monitor 82 measures the pressure of the incoming water, first temperature monitor 81 ensures that the right mix of cold water 100 and hot water 102 is being achieved, first pH monitor 79 monitors pH of water source 101, and first flow rate monitor 78 measures flow rate. Pressure regulation or reduction valve 83 assists in ensuring the appropriate water pressure. Mixed water 106 then passes through first pump 84 (optional) to achieve the necessary pressure entering the next section of the system should city water pressure be inadequate. Second pressure monitor 86 (optional) ensures that pump 84 is creating the right head or pressure on the water 106. Water 106 then passes through cartridge filters 88 to sift out particulate matter. Filtered water pressure gauge 87 measures the water pressure passing out of cartridge filters 88. Sample port 89 is provided to measure the quality of water after being filtered by cartridge filter 88. Filtered water 107 is then sent into water softener 90. Soft water monitor 92 then measures soft water pressure. Soft water sampling port 91 then allows user to sample softened water 109. Soft water passes through first carbon filter or tank 94' and then second carbon filter or tank 94". Carbon filter pressure monitors 97' and 97" monitor pressure after respective filters 94' and 94". Also carbon sample port 99 allows user to sample water after first carbon filter 94' to ensure that carbon filter 94' is working. If not, second filter 94" will act as a back-up in case carbon filter 94' is spent. Carbon filters 94 filter out organic material and dissolved gases (particularly chlorine and chloramines). Carbon filter backwash waste 95 passes into drain 104 (optional). Carbon-filtered water 112 is then sent into pretreatment cartridge filter 114. Water is then pressure monitored at reverse osmosis feed water pressure monitor 116 before passing into reverse osmosis unit 118. Before passing into circulation pump 128, RO water 130 passes through permeate pressure monitor 132 and permeate conductivity monitor 134. RO water can be sampled at RO sampling valve 136. Circulated water 138 then passes into water input flow monitor 98 before passing into circulated pressure monitor 140. Circulated water 138 then passes into storage tanks 124 having level indicator monitor 144. Waste water is directed into drain 108. After passing into water storage 124, water flows through loop piping 123 into dialysis units 110. In the preferred embodiment, water storage units 124 are sized sufficiently to allow any of the upstream components to be exchanged without having to terminate the flow of liquid into dialysis units 110.

As seen in FIG. 2, the connection of the loop piping 123 to the storage tank 124 can be described as a loop feed connection 123A, and the connection of the loop piping 123 to the circulation pump 128 can be described as a loop return connection 123B.

Figure 3:
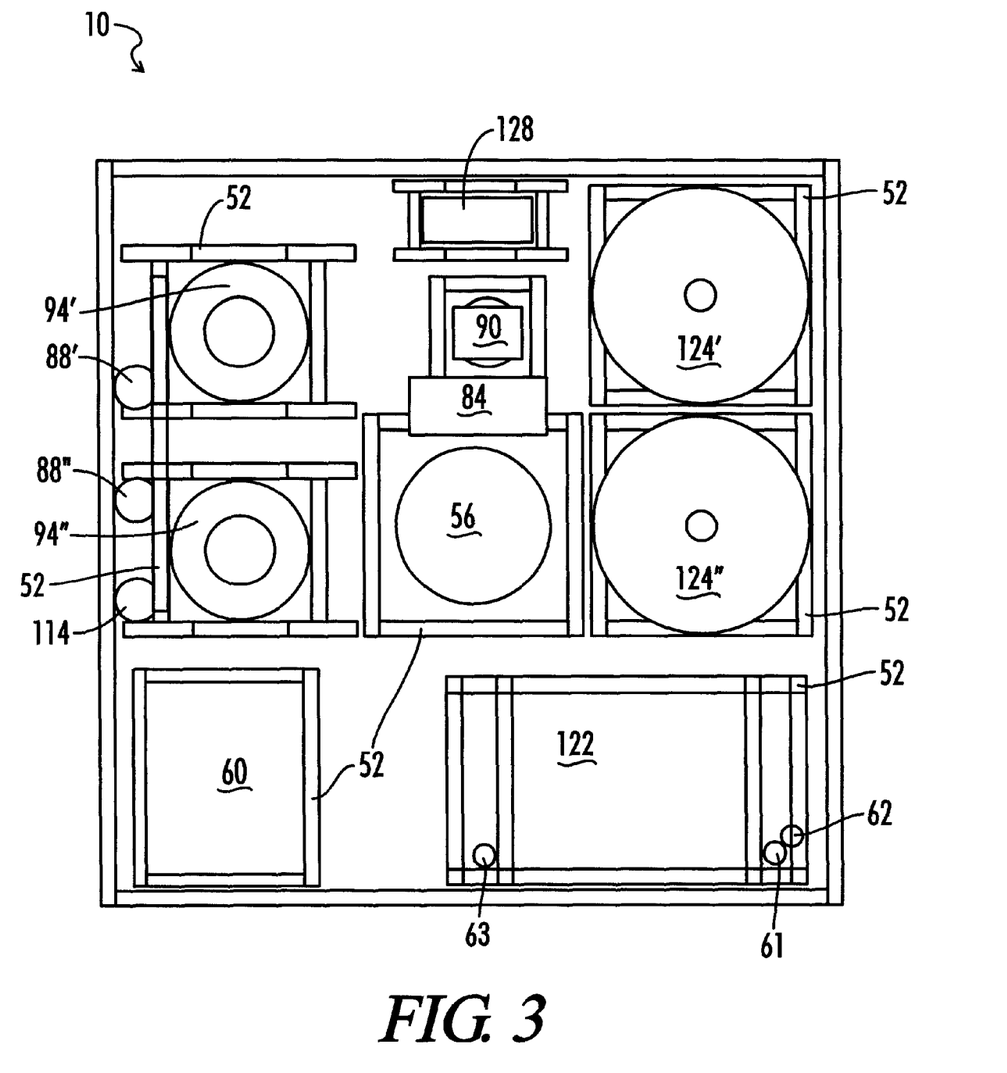
FIG. 3 is a top view of the system of the present invention.

Referring now to FIG. 3, there is shown generally at 10 a top view of the portable water treatment facility. Referring to FIGS. 2 and 3 at the same time, one can see that water coming into system first passes through pump 84 before passing into cartridge filter 88. Water passes from cartridge filter 88 into water softener 90 and then into carbon filters 94. In the preferred embodiment, first carbon filter 94' and second carbon filter 94" are provided in series to provide enhanced and redundant filtering and so carbon filter 94" may serve as backup in case the carbon in carbon filter 94' is spent. Water passes from carbon filters 94 through pretreatment cartridge filter 114. From filter 114, water passes through feed water manifold 61 to reverse osmosis (R.O.) machines 118 in reverse osmosis cabinet 122. Purified R.O. water collects and travels through permeate manifold 63 to reverse osmosis water circulation pump 128. Reverse osmosis waste reject water collects and travels through reject manifold to drain 106. Water treatment member 16 also provides storage tanks 124. In the preferred embodiment, first tank 124' and second tank 124" operate so that one can be serviced without interrupting water delivery. In the preferred embodiment, each of carbon filters 94, brine tank 56, water softener 90, and storage tanks 124 are placed in structural aluminum frames 52 on structural aluminum frame castors 54 so that they can be removed easily. FIG. 3 also shows monitoring system 60 which, among other things, monitors 82, 86, 92, and 96. Reverse osmosis cabinet 122 provides, in the preferred embodiment, a framework on castors which may support a single or multiple reverse osmosis machines for connection to feed water supply manifold 61, reject manifold 62, and permeate manifold 63. As can be seen in FIG. 3, feed brine tank 56 performs the function of regeneration of the water softener 90.

Figure 4:
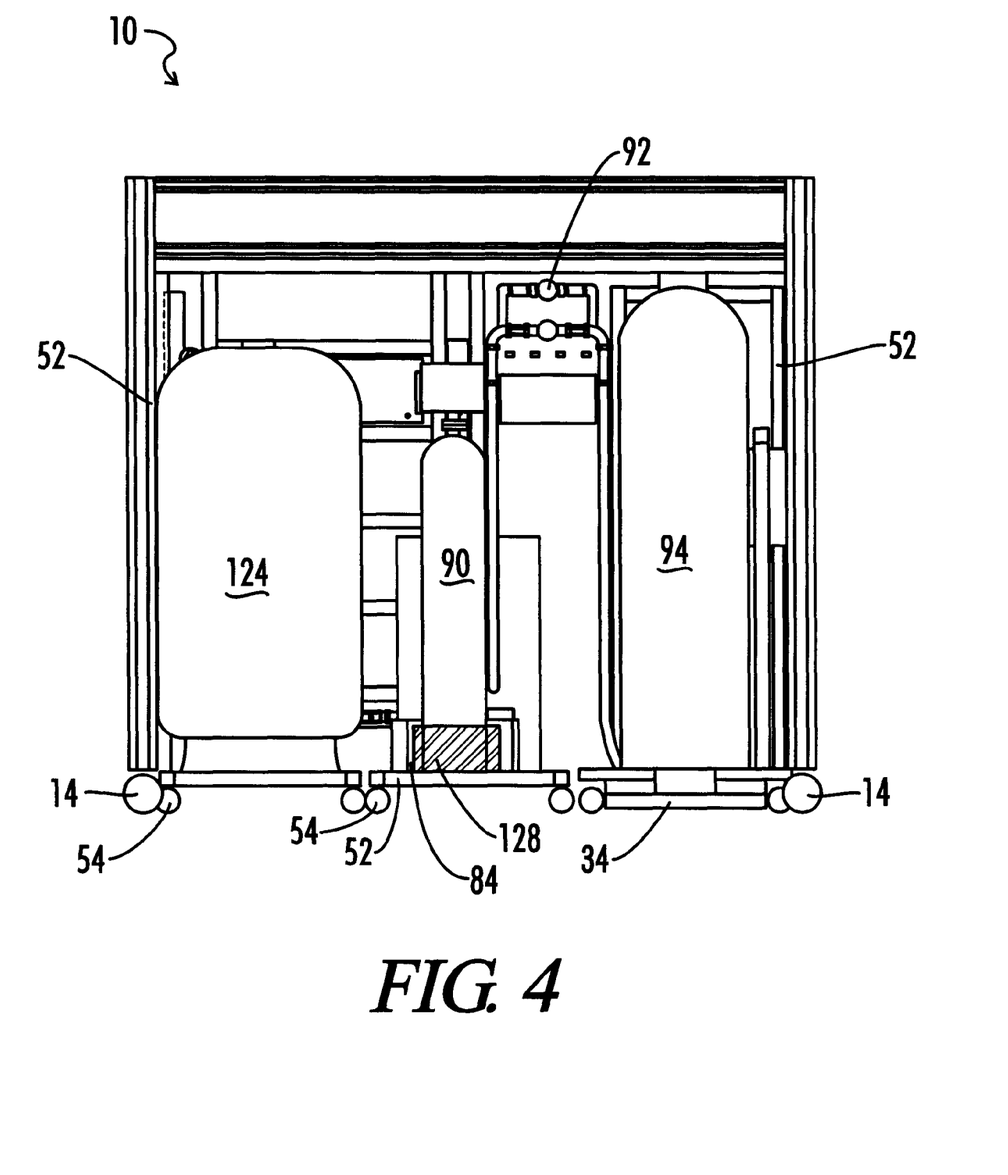
FIG. 4 is a rear view of the system of the present invention.

Referring now to FIG. 4, there is shown generally at 10 a rear view of the system of the present invention. This view shows permeate storage tank 124, carbon filter 94, and water softener tank 90. This also shows the connection between carbon filter 94 and softener 90 through third pressure monitor 92. Also, this drawing shows boost pump 84 (optional) and circulation pump 128. Further, this particular figures shows that carbon filter 94', water softener 90, and water storage 124 are placed in aluminum frame 52 on aluminum frame castor 54. Aluminum frame castors 54 combined with castors 14 make the entire system easily portable.

Figure 5:
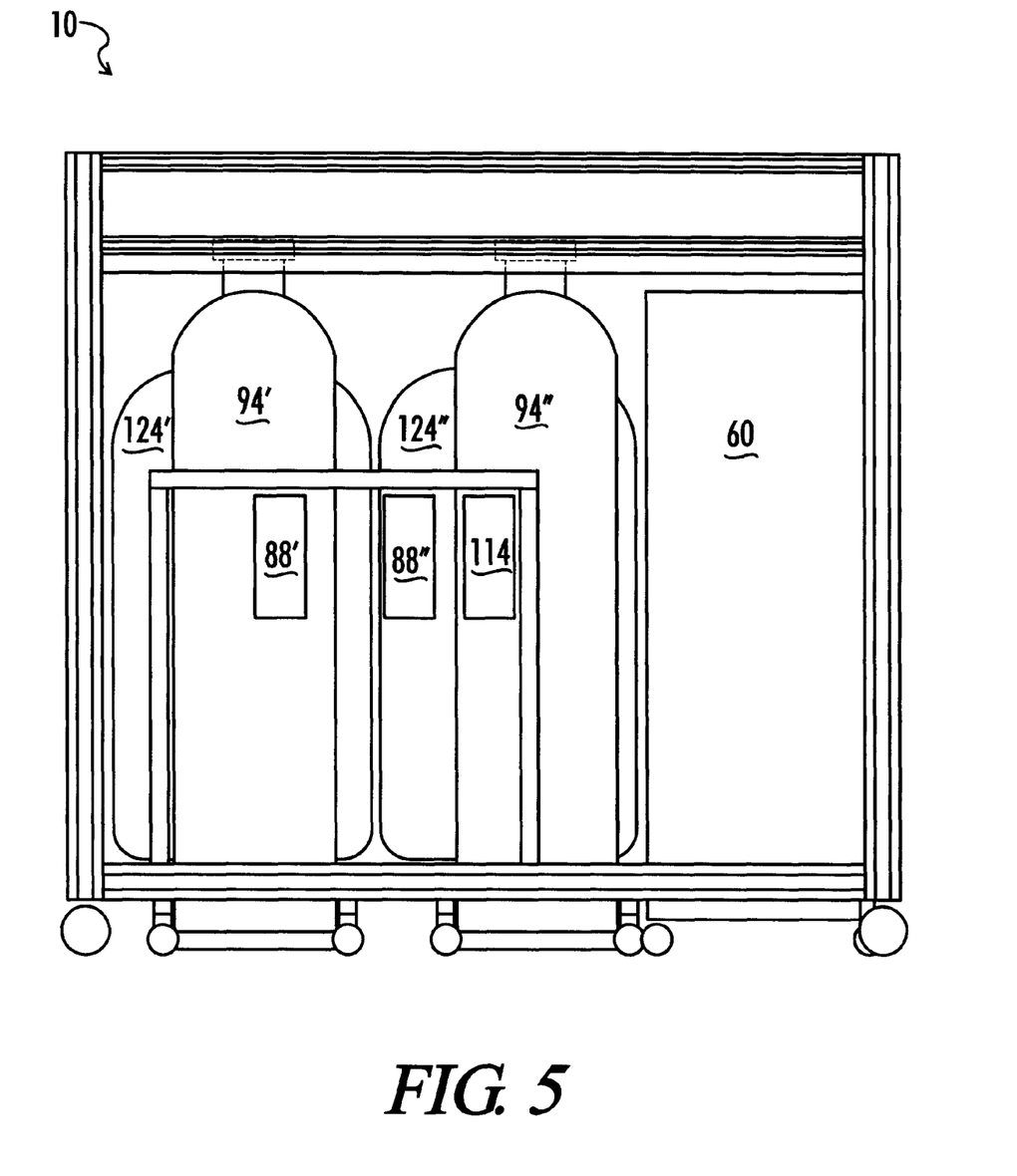
FIG. 5 is a left side view of the water treatment facility of the present invention.

Referring now to FIG. 5, there is shown generally at 10 the portable water treatment facility of the present invention. In this embodiment, carbon filters 94', 94" are shown. Preferably cartridge filters 88', 88" and 114 are mounted proximal to carbon filters 94. This view also shows a portion of storage members 124' and 124". Further, this view shows a side view of monitoring system 60.

Figure 6:
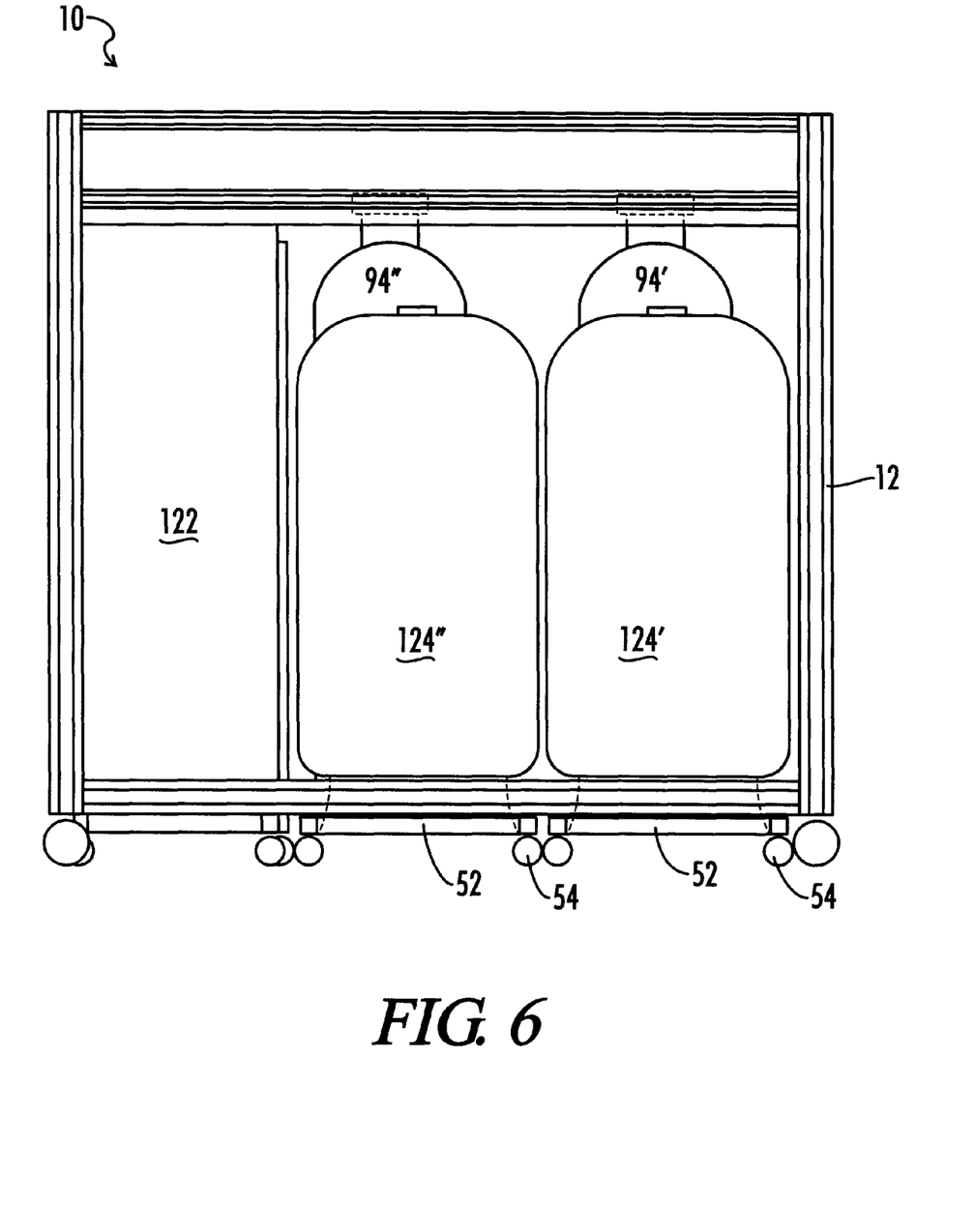
FIG. 6 is a right side view of the system of the present invention.

Referring now to FIG. 6, there is shown generally at 10 another view of the present invention. As can be seen, permeate storage tanks 124' and 124" are split into housing 12 using structural aluminum frames 52 on castors 54. Additionally, a portion of carbon filters 94', 94" are shown together with reverse osmosis cabinet 122.

Figure 7:
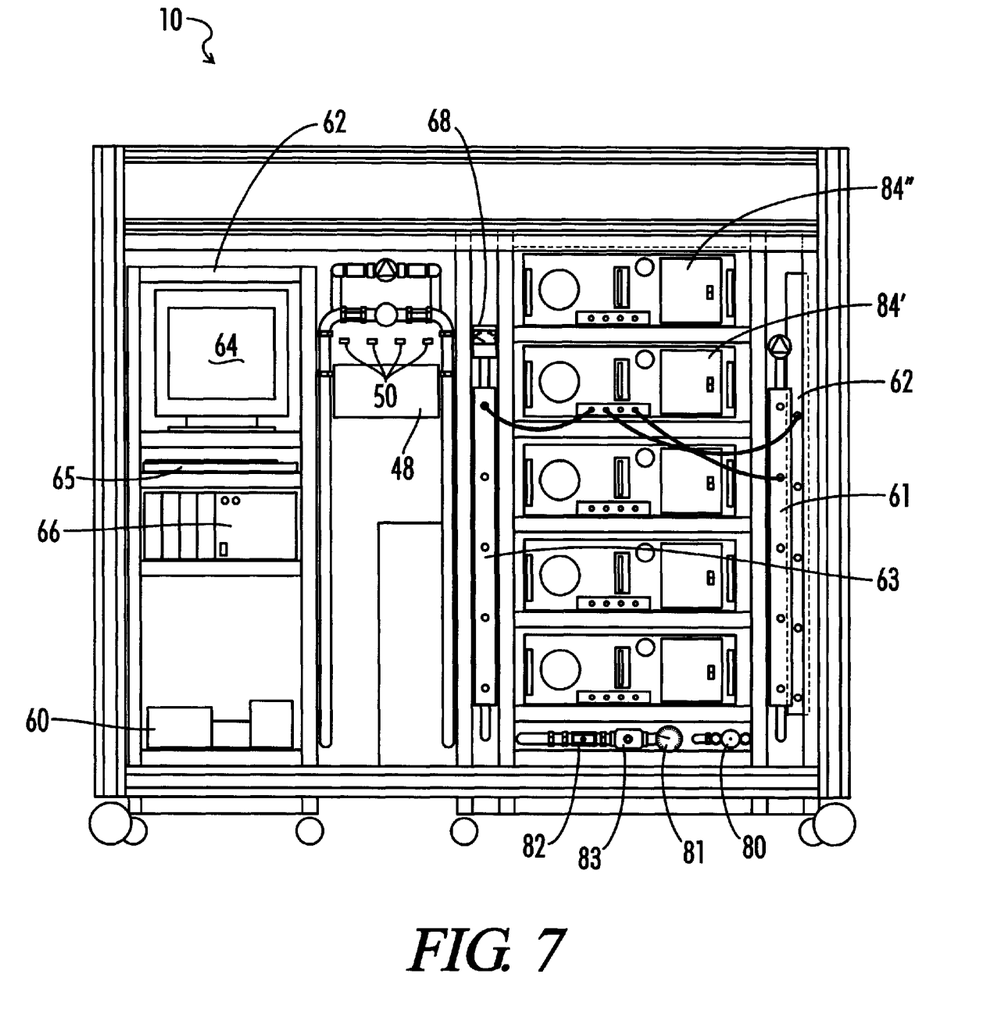
FIG. 7 is a front view of the system of the present invention.

Referring now to FIG. 7, there is shown generally at 10 another view of the present invention. In this particular embodiment, monitoring system 60 is shown in great detail. In the preferred embodiment, monitoring system 60 has standard computer monitor 64 for displaying the status of the system. In the preferred embodiment, inputs from the various monitors and filters as well as door lock monitors are fed into a system which is programmed using Labview™ for Windows™. Attached to monitor 64, there is keyboard 65 and CPU 66. Monitoring system 60 is electronically connected into computer system 67. FIG. 7 also shows sampling station 48 and buttons 50. FIG. 7 further shows the various manifolds such as feed water manifold 61, permeate manifold 63, and reject manifold 62. Position of blending valve 80, and first temperature gauge 81 are shown to demonstrate the interaction between temperature gauge 81 increasing the flow of water through valve 80 of either hot water 102 or cold water 100. Pressure gauge 82 cooperates with first pressure regulation valve 83 to ensure that the water passing into cartridge filters 88 are at the right pressures. Finally, FIG. 7 also contains conductivity meter 68 which measures conductivity providing an indication of water quality.

In the preferred embodiment, cartridge filters 88 are Aqua pure 25 to micron filter 2. In the preferred embodiment, carbon filters 94 are Osmonics AC36P filters. In the preferred embodiment water softeners 90 are Culligan HiFlo 2 automatic water softeners.

Thus, although there have been described particular embodiments of the present invention of a new and useful Portable Water Treatment Facility, it is not intended that such references be construed as limitations upon the scope of this invention except as set forth in the following claims.

What is claimed is:

1. A portable water treatment facility for treating water from a source and for providing treated water to at least a first and a second dialysis machine connected by loop piping, comprising:
    a water treatment device for treating water from the source for the at least two dialysis machines;
    a storage tank for storing treated water;
    a circulation pump for circulating treated water to the at least two dialysis machines;
    a portable housing surrounding the water treatment system, the storage tank and the circulation pump; and
    a loop feed connection and a loop return connection, for connecting the facility to the loop piping external of the housing so that the circulation pump can circulate treated water through the loop piping and the storage tank.

2. The portable water treatment facility of claim 1, wherein:
    the water treatment device includes a series of pre-filters and a reverse osmosis filter for purifying the water into permeate for use by the at least two dialysis machines; and
    the storage tank is a permeate storage tank having sufficient capacity to supply permeate to the at least two dialysis machines.

3. The portable water treatment facility of claim 1, wherein:
    the facility is pre-fabricated and can be completely plumbed by and includes five plumbing connections including:
    (1) hot water in from source;
    (2) cold water in from source;
    (3) a the loop feed connection;
    (4) a the loop return connection; and
    (5) a drain.

4. The portable water treatment facility of claim 1, further comprising:
    a first plumbing connection for hot water in from the source;
    a second plumbing connection for cold water in from the source;
    the loop feed connection being a third plumbing connection for loop feed to the loop piping;
    the loop return connection being a fourth plumbing connection for loop return from the loop piping; and
    a fifth plumbing connection for a drain.

5. The portable water treatment facility of claim 1, wherein the water treatment device comprises:
    a plurality of filters for purifying the water from the source; and
    a feed water booster pump upstream from the plurality of filters.

6. The portable water treatment facility of claim 1, wherein the water treatment device comprises:
    a plurality of carbon filters in series.

7. The portable water treatment facility of claim 6, wherein:
    the carbon filters are plumbed to permit back washing of the carbon filters.

\* \* \* \* \*

UNITED STATES PATENT AND TRADEMARK OFFICE
CERTIFICATE OF CORRECTION

PATENT NO.     : 6,616,839 B1
DATED          : September 9, 2003
INVENTOR(S)    : Peterson et al.

It is certified that error appears in the above-identified patent and that said Letters Patent is hereby corrected as shown below:

Column 2,
Line 37, replace "(" with -- ® --.

Column 8,
Lines 11 and 12, delete "a" before -- the --.

Signed and Sealed this

Twenty-eighth Day of October, 2003

JAMES E. ROGAN
*Director of the United States Patent and Trademark Office*